Patented June 8, 1926.

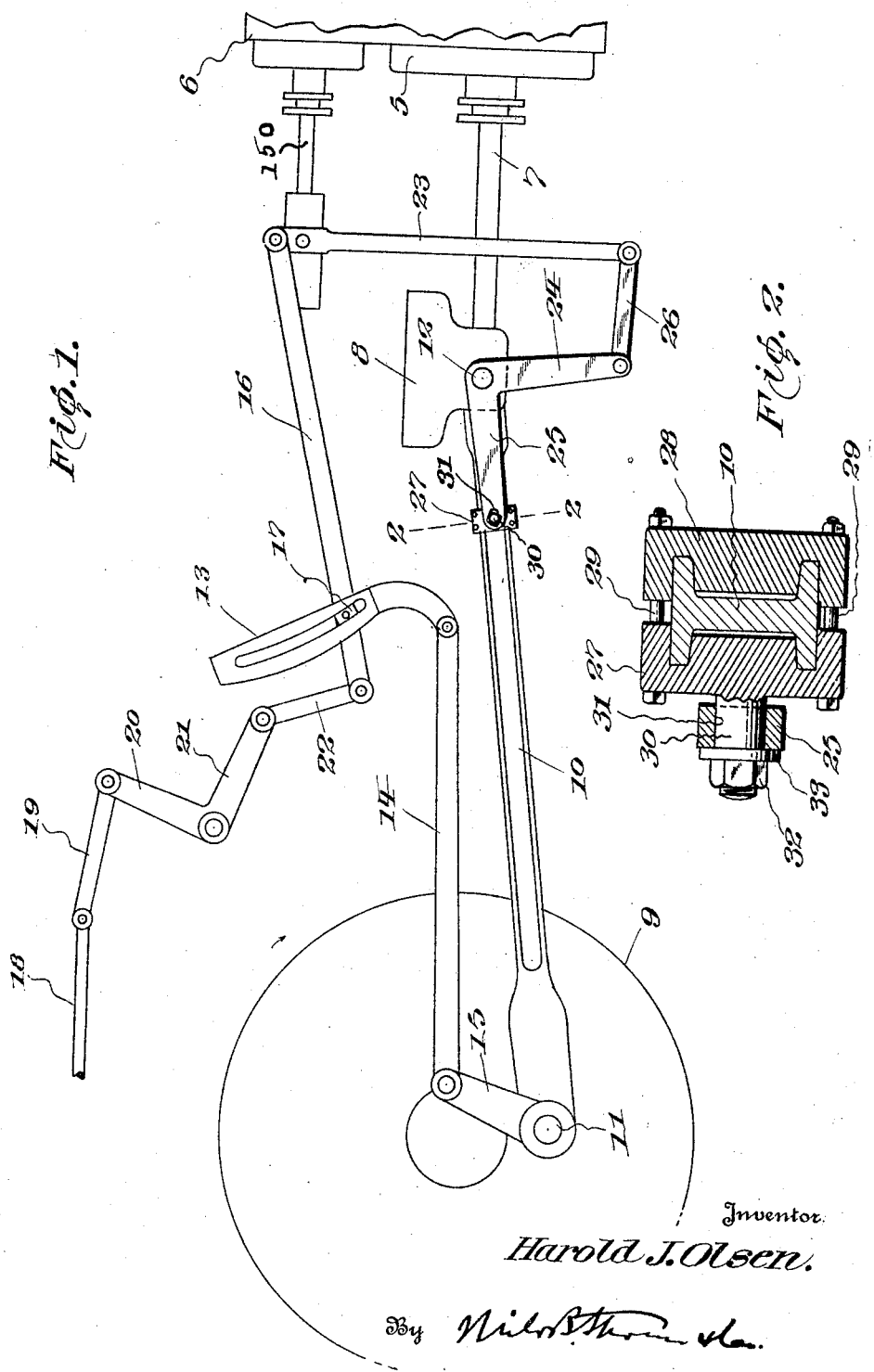

1,587,796

UNITED STATES PATENT OFFICE.

HAROLD J. OLSEN, OF CHICAGO, ILLINOIS.

LOCOMOTIVE GEAR.

Application filed June 23, 1922. Serial No. 570,365.

This invention relates to steam engine valve gear mechanism, and more particularly to valve gears of the Walschaert type.

An important object of this invention is to provide a steam engine valve gear having simple means to bring about the more efficient distribution of steam at various engine speeds.

Also, an important aim of the invention is to provide a steam engine valve gear in which the improvement over the valve gear of the Walschaert type may be easily applied without a substantial modification of the original valve gear and without the possibility of damaging or breaking the improvement as a result of thumping of the engine.

The object stated is attained by means of a novel combination and arrangement of parts to be hereinafter described and claimed, and in order that the same may be better understood, reference is had to the accompanying drawing.

In the drawing, Fig. 1 is an elevation of the improved gear, and Fig. 2 is an enlarged cross-section on the line 2—2 of Fig. 1.

Referring specifically to the drawing, 5 and 6 denote, respectively, fragments of the engine cylinder and the valve chest. The piston rod is shown at 7, and the valve rod at 150. The piston rod 7 is connected to a cross-head 8' from which latter motion is transmitted to the wheel 9 or other element to be driven, by a connecting rod 10 and a crank pin 11, said rod being connected to the cross-head by a wrist-pin 12. A link 13 is rocked by an eccentric rod 14 connected at one end to the bottom of the link and at its other end to an eccentric crank 15 secured to the crank pin 11. The movement of the link 13 is transmitted to the valve rod 150 by a radius rod 16 which is pinned to a sliding link block 17. The radius rod 16 can be raised or lowered by the reverse lever (not shown) through the usual connections 18, 19, 20, 21 and 22 which need not be described in detail as they are well known and form no part of the present invention. When the block 17 is on one side of the link center the engine runs in one direction, and when said block is on the other side of the link center the engine is reversed.

The lead of the valve is determined by the combination lever 23 which is attached at one end to the valve rod 150. In the ordinary Walschaert gear, the combination lever 23 is connected at its lower end, by means of a link, to the cross-head so that it receives motion only from the reciprocatory motion of the cross-head. However, in the present structure, this cross-head link has been eliminated and there has been connected to the cross-head an angle lever, the branches of which are denoted by the reference characters 24 and 25. This lever is fulcrumed at its angle on the wrist-pin 12, and its branch 24 is connected by a link 26 to the lower end of the combination lever 23. The lever branch 25 is connected to the connecting rod 10 a short distance ahead of the cross-head, in view of which the angle lever is rocked by the oscillatory motion of the connecting rod.

The connection between the connecting rod 10 and the lever branch 25 is shown in detail in Fig. 2. On opposite sides of the rod 10 are clamped plates 27 and 28 shaped at their inner faces to fit the rod sides thereby defining a saddle. These plates are clamped together on the connecting rod by bolts 29. From the outer face of the plate 27 extends a pivot stud 30 which extends into a slot 31 in the lever branch 25. A nut 32 and a washer 33 mounted on the outer end of the stud 30, completes the connection.

The slot 31 in the angle lever is to allow for the wearing of the bearings or brasses and keying the forward end brasses or bearings on the connecting rod 10. Furthermore, if the slot 31 were lacking and the pounding should develop in the brasses or the keys should get loose, this pounding would break the angle lever or pivot pin 30. The presence of the slot avoids this. The pivot pin 30 is set in the center of the slot 31.

From the foregoing it will be understood that the only change which has been made in the gear is to provide the angle lever consisting of the branches 24 and 25, together with the connection between said lever and the combination lever 23, as well as the connection between said lever and the connecting rod 10. In the use of the ordinary Walschaert gear slowness of starting is due to the great constant lead required at short cut-offs.

The majority of Walschaert gears are set with one-quarter inch lead in full forward gear and back gear and short cut-off. With the angle lever an engine set with a oneeighth inch lead in full gear in forward motion will start quicker and at the same time will have sufficient port opening at short cut-offs. This is true because the angle lever delays the action of the combination lever and gives a longer maintained port opening as the crosshead has reached its forward travel and commences its return stroke, which stroke when completed places the connecting rod in an inclined position. With the use of the ordinary Walschaert gear, slowness of starting is due to the long constant lead required at short cut-offs in order to obtain sufficient port opening where little opening other than that transmitted by the combination lever 23 is given to the valve. This constant lead is too excessive for a maximum cut-off and the starting of a train, as it requires one-half the movement of the crosshead to overcome the lap and lead. This has a tendency to slow up the action of the valve gear as ordinarily connected. By the use of the angle lever connection, in addition to receiving the usual cross-head motion, the combination lever 23 also receives a supplementary motion from the oscillatory motion of the connecting rod 10. The largest part of this movement occurs as the cross-head 8 approaches and recedes from the end of its travel, and this gives the combination lever an entirely different movement from that imparted by the ordinary cross-head connection. With the angle lever connection, later release, and longer maintained port opening with the same cut-off, and more uniform valve movement are obtained. The connection also permits a shorter cut-off with its constant saving of steam, and this combined with the longer maximum cut-off obtainable, make it absolutely certain that a quicker starting, a faster, a more powerful, and a more economical engine is obtained. Referring to Fig. 1 the engine is shown going ahead, and when the connecting rod 10 passes dead center and assumes the inclined position the angle lever swings on the wrist-pin pivot 12 which swings the lever arm 24 to the right, thereby causing a delay in the movement of the combination lever 23.

I claim:

1. In a steam engine valve gear, the combination with the crosshead, the connecting rod and the combination lever, of an angle lever connected intermediate its ends to said crosshead for swinging movement and having a branch operatively connected to said combination lever and having a second branch provided with a slot, and a clamping member secured on said connecting rod and having a pin received in said slot and establishing connection between said connecting rod and said crank.

2. In a steam engine, the combination with a crosshead, a connecting rod and a wrist pin connecting the crosshead and the connecting rod; of an L-shaped crank consisting of branches and being pivotally supported at the juncture of its branches by the said wrist pin which joins the crosshead and said connecting rod, one of the branches of said L-shaped crank being approximately parallel to said connecting rod and having its outer terminal portion connected to said rod, a link connected to the lower terminal portion of the other branch of said crank; a combination lever connected to said link; and a valve mechanism to which said combination lever is connected.

In testimony whereof I affix my signature.

HAROLD J. OLSEN.